Dec. 2, 1969   R. J. GATZ   3,481,243

THREADED FASTENER HAVING TOOL RECEIVING RECESS

Filed March 27, 1968

INVENTOR.
RAYMOND J. GATZ
BY
Yount, Flynn & Tarolli
ATTORNEYS

Patent 3,481,243

3,481,243
THREADED FASTENER HAVING TOOL RECEIVING RECESS
Raymond J. Gatz, Lakewood, Ohio, assignor to The Lamson & Sessions Co., Cleveland, Ohio, a corporation of Ohio
Filed Mar. 27, 1968, Ser. No. 716,402
Int. Cl. F16b 35/00
U.S. Cl. 85—45                          6 Claims

ABSTRACT OF THE DISCLOSURE

A bolt having a recess formed in the leading end of its threaded body for receiving a tool to hold the bolt against rotation while a nut is being applied to the bolt. The recess includes a relatively large central opening having a generally square cross-sectional configuration and a plurality of relatively small grooves or wings extending diagonally outwardly from the relatively large central opening. Each of the grooves includes primary and secondary drive surfaces for transmitting force between the tool and the bolt.

---

Tool receiving recesses are commonly formed on the ends of many prior art bolts by means of punches or dies having a relatively small central portion and a plurality of sidewardly extending projections. Due to the relatively small cross-section of the central portion and large radial length of the projections, the punches or tools for making these prior art recesses are frequently broken after a short service life. Another problem frequently encountered in conjunction with the recess of prior bolts is a disengagement or camming out of a drive tool from the recess when an attempt is being made to transmit substantial force between the tool and bolt.

Accordingly, it is an object of this invention to provide a new and improved bolt having a recess in the leading end of its threaded body for engagement with a tool for holding the bolt against rotation during the application of a nut to the bolt wherein the recess includes radially outwardly extending grooves having primary and secondary surfaces for transmitting force between the tool and the bolt.

It is another object of this invention to increase the service life of bolt recess forming punches or tools by providing a new and improved recess for an end of a bolt wherein the recess has a central opening which is relatively large in cross-section and a plurality of relatively small grooves extending outwardly from said central opening.

Another object of this invention is to provide a new and improved tool receiving recess for an end of a fastener wherein the recess has a relatively large central opening and a plurality of relatively small outwardly projecting grooves each of which has primary and secondary drive surfaces for transmitting force between the tool and bolt.

These and other objects and features of the invention will become more apparent upon a consideration of the following description taken in connection with the accompanying drawings wherein.

This invention relates to a recess formed in the leading end of a threaded body of a bolt for receiving a tool to hold the bolt against rotation while a nut is applied to the bolt.

Figure 1:
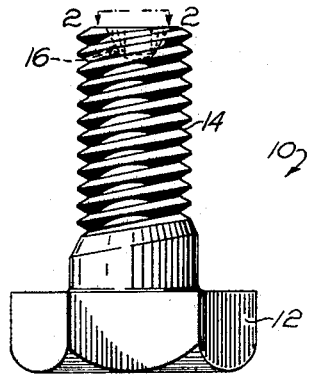
FIG. 1 is a side view of a bolt constructed in accordance with the present invention.

A bolt 10, constructed in accordance with the present invention, is illustrated in FIG. 1 and includes a head 12 and an outwardly projecting threaded body 14. A recess or socket 16 is formed in the axially outermost or leading end of the threaded body 14 for receiving a tool or bit to hold the bolt 10 against rotation when a nut is applied to the threaded body 14. By engaging the recess 16 with a suitable tool, conforming generally in shape to the configuration of the recess, the bolt 10 can be held against rotation without engaging the head 12 of the bolt with a wrench. This is particularly advantageous at installations where the head 12 is hard to get at or a large number of nuts and bolts are to be applied with a power wrench.

Figure 2:
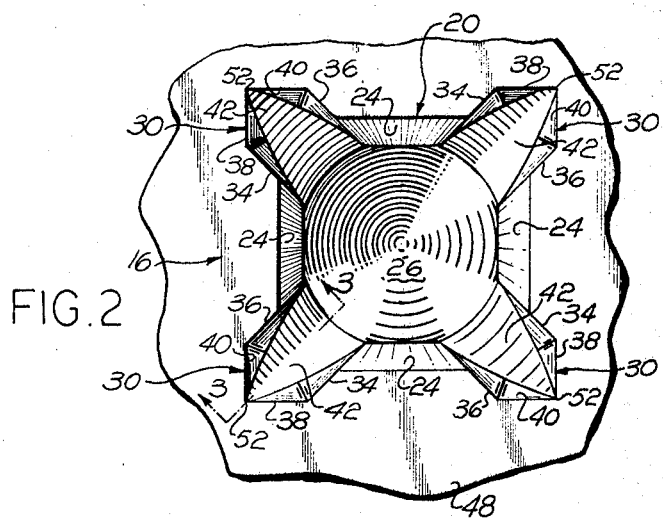
FIG. 2 is an enlarged plan view, taken along the line 2—2 of FIG. 1, illustrating the structure of a recess formed in an axially outermost or leading end of the bolt.

Most known fastener end recesses, similar to the recess 16, are formed with a relatively small central opening which leads to breakage of forming punches or tools during the manufacturing operation. To reduce punches or tools breakage, the recess 16 (see FIG. 2) has a large central opening 20 with a generally square cross-sectional configuration. This enables a die having a large cross-section, which is capable of transmitting large loads without breaking, to be used to form the recess 16. The relatively large central opening 20 also enables a relatively heavy tool, capable of transmitting substantial forces, to engage the recess 16 during the application of a nut to the bolt 10.

The central opening 20 includes a plurality of opposed outwardly diverging wall planes or surfaces 24 which terminate at a widely flaring generally cone-shaped bottom 26. The tapered or sloping walls 24 are adapted to be abuttingly engaged by correspondingly sloping or tapered side surfaces of a relatively heavy tool to retain the bolt 10 against rotation. By experimentation, it has been found that the force transmitting capabilities of a tool for retaining the bolt 10 against rotation and the service life of the punches or tools for forming the recess 16 are maximized, without adversely affecting the strength of the bolt, when the distance between opposite wall surfaces 24 of the central opening 20 is equal to or greater than forty percent of the minor diameter of the threaded body 14.

Figure 3:
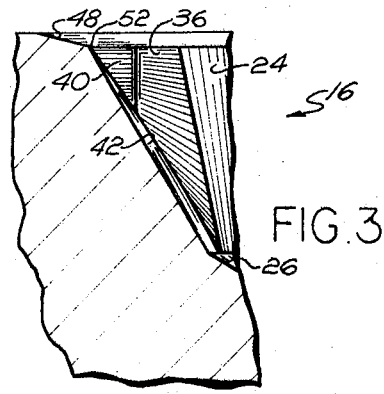
FIG. 3 is a fragmentary sectional view, taken along the line 3—3 of FIG. 2, illustrating the structure of a wing or groove which extends outwardly from a central opening of the recess.

A plurality of grooves or wings 30 extend diagonally or radially outwardly at corner portions of the central opening 20 and are adapted to receive correspondingly shaped projections on a tool. Each of the grooves 30 includes a pair of opposed primary drive surfaces 34 and 36 and a pair of secondary drive surfaces 38 and 40 (see FIGS. 2 and 3) for transmitting force between the bolt and projections from the relatively heavy center portion of the tool. The primary drive surfaces 34 and 36 cooperate with the outward projections of the tool to transmit force in a direction generally perpendicular to the longitudinal axis of the groove 30. The secondary drive surfaces 38 and 40 cooperate with the outward projections on a tool to transmit force at an angle to the longitudinal axis of the groove 30. Of course, the tool also cooperates with the sloping walls 24 of the central opening 20 to thereby provide a third set of driving surfaces.

With many prior art recesses it is impossible or difficult to transmit relatively large forces between the tool and the bolt due to a camming out or disengagement of the tool with the recess when an attempt is made to transmit the force between the tool and bolt. However, it has been determined that with the combination of the walls 24, primary drive surfaces 34 and 36 and secondary drive surfaces 38 and 40, the tool tends to remain in engagement with the recess 16 even when relatively large forces are being transmitted between the tool and the bolt 10. With the recess 16, the tool is usually broken due to a transmission of force before it is cammed out of the recess. The exact reason for this advantageous performance of the recess 16, in transmitting relatively large forces between the bolt and tool, is unknown. However, it is believed that the use of the combination of the primary drive surfaces 34 and 36, which extend parallel to the longitudinal axis of the groove 30, and the secondary drive surfaces 38 and 40, which extend at an angle to the longitudinal axis of the groove 30, are responsible for the substantially improved performance. These drive surfaces apparently result in the application of forces to the tool in such a manner as to minimize any tendency of the tool to cam out when relatively large forces are transmitted between the bolt and the tool.

The primary drive surfaces 34 and 36 intersect the wall surfaces 24 of the central opening 20 at an obtuse angle and extend along a plane which is generally parallel to a longitudinal axis of the associated groove 30. To facilitate forming the primary drive surfaces 34 and 36, they converge axially inwardly toward an arcurate bottom wall or surface 42 of the groove 30. The secondary drive surfaces 38 and 40 intersect the primary drive surfaces at an obtuse angle and converge toward the radially outermost portion of the groove 30 and toward the bottom wall 42.

Figure 4:
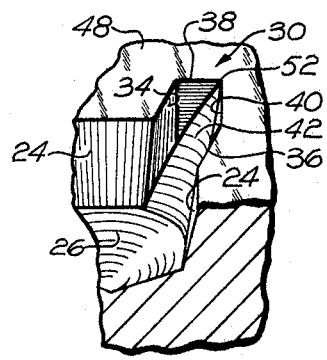
FIG. 4 is a fragmentary perspective view further illustrating the structure of one of the grooves of the recess.

The bottom surface 42, of each of the recesses 30, diverges radially and axially outwardly from the generally cone-shaped bottom 26 of the central opening 20 to intersect the leading end surface 48 of the body 14. The secondary drive surfaces 38 and 40 intersect each other, at a right angle, and the bottom surface 42 at a point 52 on the leading end surface 48 (see FIGS. 3 and 4) to provide the groove 30 with a peaked or pointed outer end portion. By experimentation, it has been determined that the grooves 30 should advantageously have a radial length, measured along the leading end surface 48, which is less than one half of the distance between opposite side walls 24 of the opening 20, as measured on the surface 48. This proportionality between the length of the grooves 30 and the size of the opening 20 results in a die configuration having relatively short projections which are not readily broken.

In view of the foregoing remarks, it is apparent that I have provided a bolt 10 with a recess 16 in its leading end for engaging a tool to hold the bolt against rotation during the application of a nut to the bolt. The recess 16 includes a relatively large central opening 20 and a plurality of relatively small grooves 30 which project diagonally outwardly from corner portions of the central opening 20. The central opening includes walls 24 and each of the grooves 30 includes primary and secondary drive surfaces 34, 36, 38 and 40 for transmitting force between the tool and the bolt when the bolt is being held against rotation. A relatively large cross-sectional area of the opening 20, compared to the relatively small extent of the grooves 30, results in a relatively long punch or tool service life and enables relatively large forces to be transmitted between the bolt and the tool. This transmission of relatively large forces between the bolt and tool is further promoted by the primary and secondary drive surfaces which cooperate with the tool in such a manner as to minimize or at least reduce, camming out or disengagement of the tool from the recess 16.

Although a particular configuration for the recess 16 has been shown and, by experimentation, has been found to be particularly advantageous, it should be understood that the invention is not to be limited to the embodiment shown. It is intended to cover by the appended claims any changes and modifications of the illustrated embodiment of the invention.

What is claimed is:

1. A bolt comprising a head section and a threaded body section extending outwardly from said head section and having a recess formed therein at an end of said body section opposite from said head section for receiving a tool to thereby retain said bolt against rotation, said recess including a central opening having axially outwardly diverging wall surfaces and a generally square cross sectional configuration on a plane extending radially of said body section, a plurality of grooves extending outwardly from corner portions of said central opening, each of said grooves including a pair of spaced apart and opposed primary drive surfaces intersecting said wall surfaces of said central opening and extending outwardly from said central opening along axially inwardly converging planes which extend generally parallel to a longitudinal axis of said groove, a bottom surface sloping axially and radially outwardly from said central opening and extending between axially innermost ends of said primary drive surfaces, and a pair of opposed secondary drive surfaces diverging axially outwardly from said bottom surface and converging outwardly in a generally radial direction to form an outer end portion of said groove, each of said secondary drive surfaces intersecting an associated one of said primary drive surfaces at an obtuse angle whereby force may be transmitted between said tool and both said primary and secondary drive surfaces of each of said grooves.

2. A bolt as set forth in claim 1 wherein said grooves extend outwardly from said central opening for a distance which at an axially outermost end surface of said body is less than one half of the distance between opposite wall surfaces of said opening at said axially outermost end surface of said body section.

3. A bolt as set forth in claim 2 wherein said bottom surface intersects said outermost end surface and said secondary drive surfaces to form the outer end portion of said groove with a generally peaked configuration.

4. A bolt as set forth in claim 1 wherein said distance between opposite wall surfaces of said opening at an axially outermost end surface of said body section is more than forty percent of the minor diameter of said threaded body section.

5. A bolt having a head portion, a threaded body, and a recess formed in said bolt for receiving a tool and transmitting force between said tool and bolt, the improvement wherein said recess includes a plurality of relatively small grooves extending outwardly from a relatively large central opening, each of said grooves including a pair of opposed primary drive surfaces extending outwardly from said central opening and a pair of secondary drive surfaces intersecting said primary drive surfaces at obtuse angles and converging in a generally radially outward direction to form a radially outer end portion of said groove, said secondary drive surfaces having an axial extent substantially equal to the axial extent of said primary drive surfaces at said intersection between said primary and secondary drive surfaces, said central opening being adapted for engagement with a relatively large central portion of said tool and said primary and secondary drive surfaces of each of said grooves being adapted to be engaged by a projection extending outwardly from said central portion of said tool to thereby transmit force between said tool and said bolt.

6. A bolt comprising a head section and a threaded body section extending outwardly from said head section and having a recess formed therein for receiving a tool, said recess including a central opening having axially outwardly diverging wall surfaces and a generally square cross sectional configuration on a plane extending radially of said body section, a plurality of grooves extending outwardly from corner portions of said central opening, each of said grooves including a pair of spaced apart and opposed primary drive surfaces intersecting said wall surfaces of said central opening and extending outwardly from said central opening, a bottom surface sloping axially and radially outwardly from said central opening and extending between axially innermost ends of said primary drive surfaces, and a pair of opposed secondary drive surfaces diverging axially outwardly from said bottom surface and converging outwardly in a generally radial direction to form an outer end portion of said groove, each of said secondary drive surfaces intersecting an associated one of said primary drive surfaces at an obtuse angle whereby force may be transmitted between said tool and both said primary and secondary drive surfaces of each of said grooves.

References Cited

UNITED STATES PATENTS

| | | | |
|---|---|---|---|
| 2,082,748 | 6/1937 | Brown | 85—45 |
| 2,216,381 | 10/1940 | West et al | 85—45 |
| 2,940,495 | 6/1960 | Wing. | |
| 3,170,364 | 2/1965 | Johnson | 85—45 |

RAMON S. BRITTS, Primary Examiner